United States Patent [19]

de Cortanze

[11] Patent Number: 4,650,027

[45] Date of Patent: Mar. 17, 1987

[54] COUPLING DEVICE BETWEEN A FRONT SUSPENSION AND A REAR SUSPENSION OF A VEHICLE

[75] Inventor: André de Cortanze, St. Cloud, France

[73] Assignee: ELF France, Paris, France

[21] Appl. No.: 742,579

[22] Filed: Jun. 7, 1985

[30] Foreign Application Priority Data

Jun. 8, 1984 [FR] France .............................. 84 09037

[51] Int. Cl.[4] ...................... B62K 25/16; B62K 25/20
[52] U.S. Cl. .................................... 180/227; 267/177;
 267/57; 280/277; 280/284
[58] Field of Search ............... 280/284, 285, 288, 283,
 280/703, 695, 700, 277; 180/227, 219; 188/364,
 2 A; 267/177, 175, 57 R

[56] References Cited

U.S. PATENT DOCUMENTS

| 1,252,397 | 1/1918 | Carter | 267/177 X |
|---|---|---|---|
| 4,189,168 | 2/1980 | Courtney | 280/284 |
| 4,265,329 | 5/1981 | de Cortanze | 280/284 X |
| 4,398,741 | 8/1983 | Hiramatsu | 280/283 |
| 4,408,674 | 10/1983 | Boyesen | 280/284 X |
| 4,451,065 | 5/1984 | Williams, Jr. | 180/227 X |
| 4,465,156 | 8/1984 | Richardson et al. | 180/227 |
| 4,583,612 | 4/1986 | Parker | 180/227 |

FOREIGN PATENT DOCUMENTS 667373 2/1952 United Kingdom ................ 180/227

Primary Examiner—John J. Love
Assistant Examiner—Mitchell J. Hill
Attorney, Agent, or Firm—Burgess, Ryan & Wayne

[57] ABSTRACT

Coupling device between the suspension gear of a front wheel and the suspension gear of a rear wheel of a wheeled vehicle such as a motorcycle, in which the suspension deflections are transformed into substantially axial deplacements, comprising on each front and rear side of the vehicle a push-rod or equivalent hinged to the abutment of the suspension spring whereas its other end is hinged to an arm of a resilient rotary coupling member such as a torsion bar, this device being applied to the transfer of front and rear overloads of a vehicle.

4 Claims, 2 Drawing Figures

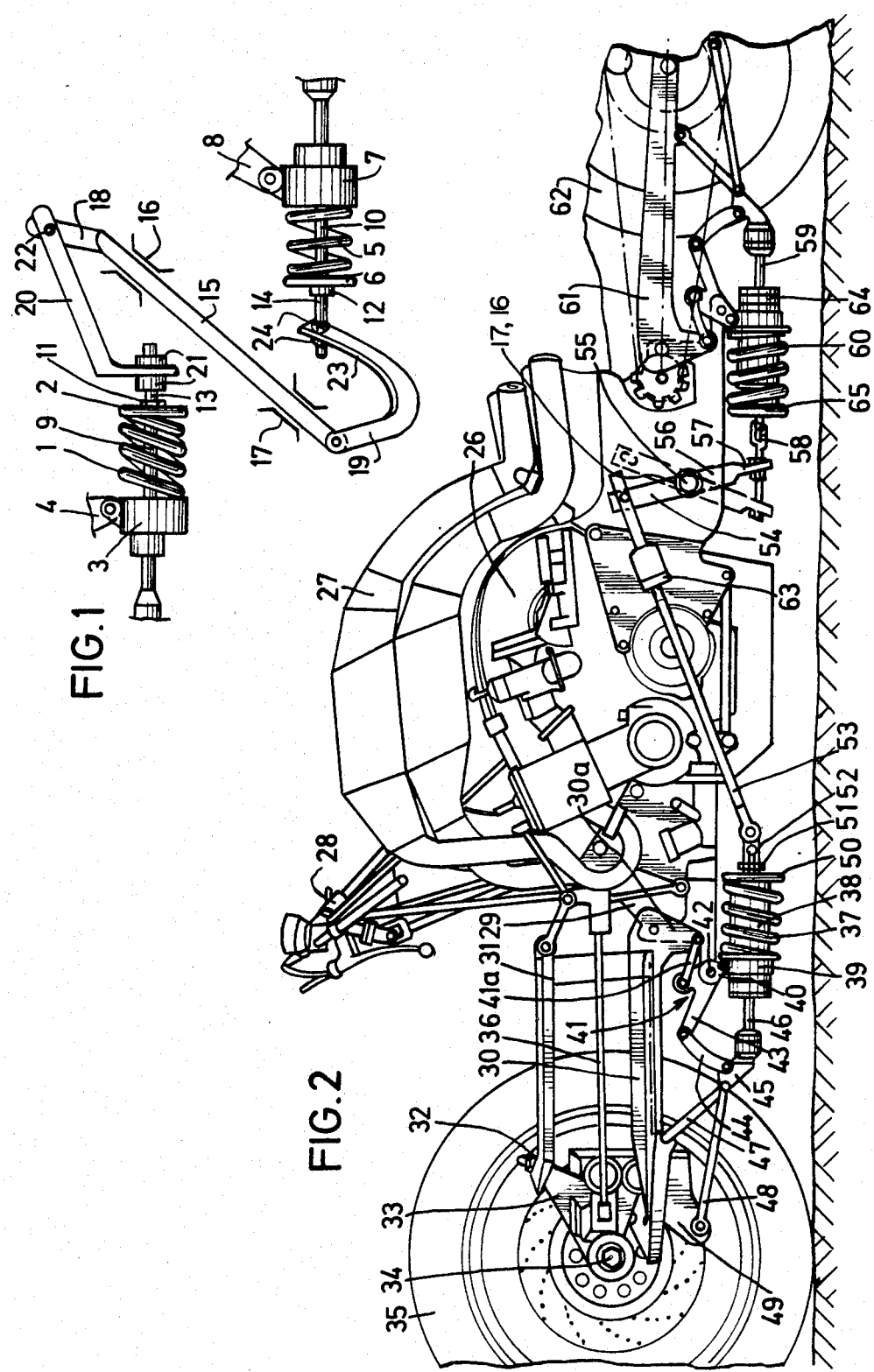

COUPLING DEVICE BETWEEN A FRONT SUSPENSION AND A REAR SUSPENSION OF A VEHICLE

FIELD OF THE INVENTION

The present inventions concerns a coupling or connecting device between the suspension of a front wheel and the suspension of a rear wheel of a wheeled vehicle such as a motorcycle, in which the suspension deflections are transformed into substantially axial displacements of a support of at least one suspension spring such as a helical spring.

BACKGROUND OF THE INVENTION

In the field of suspension of automobile vehicles, it is known to obtain a connection between the right side and the left side of the vehicle, generally by means of using a torsion bar often called "antiroll bar", so that overloading that occurs on one side of the vehicle can be partially supported by the other side of the vehicle. It is thus obtained, by means of a slight stiffening of the suspension, improved riding qualities of the vehicle, particularly in the case of lateral overloading and an improved dynamic aspect of the vehicle of which the body thus remains substantially parallel to the ground even on sloped surfaces, that correspondingly reduces risks of overturning and rolling. On the other hand, it is sought to reduce the pitch of the vehicles which is apparent from oscillations from front to rear and vice versa, especially by a dipping of the front during braking. This dipping of the front is particularly troublesome on motorcycles where it is known as "jump" or "bow". Its reduction can be carried out by a mechanical connection between the front and rear suspensions gears of the vehicle that are relatively far apart from each other.

In order to obtain the connection between the front and rear suspensions, it has already been proposed to assemble the front and rear suspensions in a single housing and to have them compressed by means of links mechanically connected to suspension arms of the wheels, but this compact and advantageous disposition of the front and rear suspension springs does not produce an effective connection for correcting the rolling or "jumping or bowing" movements of the vehicle.

SUMMARY OF THE INVENTION

One of the aims of the present invention is to connect the suspension of the front wheel of a vehicle such as a motorcycle achieved by means of a suspension arm and a suspension spring such as a compressed helical spring, to the rear suspension of the same type of vehicle so that an overloading on the front wheel is practically distributed between the front wheel and the rear wheel and vice versa.

With this purpose, the connecting device between the front and rear suspension gear comprises on each front and rear side of the vehicle a push-rod or equivalent one end of which is hinged near the abutment of the suspension spring while the other end is hinged to an arm of rotary resilient connecting member between the front and rear suspension gears of the vehicle, each push-rod being connected to the corresponding arm in a direction opposite to the other push-rod, so that, with respect to a pre-adjusted situation for distributing the compressions of the front and rear suspension gears of the vehicle, an overloading on the front wheel with respect to the pre-adjusted situation is partially supported, through the rotary connecting member, by the rear wheel and vice versa for an overload on the rear wheel or for a reduction of the load supported by one of the suspension gears.

The resilient rotary connecting member is preferably a torsion bar mounted rotary-wise on at least one bearing carried by the vehicle and each end of which is connected at least in rotation to the arm hinged to one of the push-rods which is itself hinged near the abutment of the respectively front or rear suspension spring.

According to another embodiment, the length of at least one of the push-rods or equivalent is adjustable under load so as to allow to modify the pre-adjustment of the compression of the front suspension and the rear suspension gears.

When at least one of the suspension springs is constituted by a helical spring compressed on an annular bracket by a movable plate connected to a compression rod through-crossing the helical spring and the movable plate in a substantially axial manner, the push-rod or equivalent cooperating with the suspension spring is hinged to a tip fixed to the end of the compression rod after its passage through the movable plate. The tip is thus preferably fixed to the end of the compression rod by adjustable screwing in a threaded boring of this tip on an end thread of the compression rod. The end thread of the compression rod is intended to be simultaneously utilized for adjusting the position of the tip on which is hinged the push-rod or equivalent and for adjusting the movable compression plate of the suspension spring.

BRIEF DESCRIPTION OF THE DRAWINGS

Other features, advantages and objects of the invention will become more apparent from reading the following embodiment, given by way of non-limitative illustration and with reference to the appended drawings in which:

FIG. 1 is a schematic representation in perspective of the resilient connecting device between a front suspension and a rear suspension of a vehicle;

FIG. 2 is a side view in elevation of a motorcycle utilizing the rotary connecting device according to the invention between the suspension gear of the rear wheel and that of the front wheel.

DETAILED DESCRIPTION OF THE PREFERRED EMBODIMENTS

The device for connecting the front and rear suspension gears represented in FIG. 1 proposes connecting the active portion of the front suspension constituted by a helical compression spring 1 held pressed between a movable plate 2 and a support collar 3 hinged to the vehicle by a support lug 4 with the active portion of the rear suspension gear similarly constituted by a helical compression spring 5 held pressed between a movable plate 6 and a support collar 7 connected by a support lug 8 to the vehicle chassis. Movable plates 2 and 6 are connected by compression rods 9 and 10, levers or other suspension members that provoke a traction on these rods as a function of the suspension loads, said traction being constantly balanced by the reaction force of the corresponding helical spring 1 or 5 through the intermediary of corresponding movable plate 2 or 6. Rods 9 and 10 extend corresponding support collars 3 or 7 that act as a bearing for them as well as the corresponding helical spring 1 and 5, and movable plate 2 or 6 to which they are connected by a nut 11 or 12 screwed upon a threaded end portion 13 or 14 of rod 9 or 10.

According to the invention, the connecting device is constituted by a torsion bar 15, the axis of which is substantially perpendicular to that of rods 9 and 10 and which is rotatably mounted in bearings 16 and 17 integral with the vehicle chassis (not represented). At each end of torsion bar 15 are provided arms 18 and 19 allowing to apply thereto a torsion moment. Arm 18, the deflection plane of which is situated in the vicinity of the axis of rod 9, is connected thereto by a push-rod 20, one end of which is fixed or hinged to rod 9 through the intermediary of adjustable bolts 21, whereas the other end is hinged to arm 19 by an axis of articulation 22. Arm 19, the deflection plane of which is situated at a distance from the axis of compression spring 10, is connected thereto by a curved extension 23 acting as a flexible push-rod and one end of which is fixed by adjustable nuts 24 to the threaded portion 14 of rod 10.

The functioning of the suspension connecting device represented at FIG. 1 will now be explained. It will be supposed that the front suspension gear has been subjected to an overloading, due for example, to a brake application. Rod 9 undergoes a supplementary traction that compresses spring 1 and displaces nuts 21 toward the left-hand side of the figure thereby extending a force through the intermediary of push-rod 20 on the axis of articulation 22. Arm 18 thus turns in a counter clockwise direction and drives torsion bar 15 in rotation in such direction.

Through the rotation of torsion bar 15 and lever arm 19 which is connected to it, rod 10 of the rear suspension gear is pushed towards the right-hand side of the figure and movable plate 6 connected to rod 10 compresses helical spring 5 of the rear suspension gear while no supplementary load issuing from the vehicle is applied to this spring 5 which is, on the contrary, rather an overload of the load applied to the front through the consecutive deceleration upon braking of the vehicle. The rear suspension spring 5 thus reacts to the urging of torsion bar 15 through a reaction force that subjects torsion bar 15 to a torsion moment so that a part of the overloading applied to the front suspension gear of the vehicle is thus supported by the rear suspension spring which is compressed. The coupling device according to the invention finally produces a stiffening of the front suspension gear subjected to an overloading when the rear suspension is not subjected to the same overloading, thereby preventing an exaggerated compression of the front with respect to the rear. In the case of front outload or rear overcharge with respect to the front, a similar compensating phenomenon is produced between the front and the rear suspension gears.

The motorcycle represented in FIG. 2 presents a motor driving assembly 26 with exhaust pipes 27 mounted on top and a handlebar 28, the assembly being extended by a front plate 29 on which is hinged main arm 30 of the front suspension gear. An upper arm 31 hinged to the motor driving assembly 26 cooperates with main arm 30 in order to support on fulcrums (only upper fulcrum 32 is represented) an inclined pivoting axis of a fulcrum bracket 33 of axle 34 of front wheel 35 the orientation of which is controlled by a push-rod 36 connected by cardan shafts to handlebar 28.

The connection between main arm 30 and front suspension spring 37 is achieved by means of a series of push-rods and levers the functions of which are described in a copending patent application of the applicant of the present application.

Spring 37 is mounted on a shock-absorbing body 38 hinged by a collar 39 on the small lower arm 40 of a three-arm lever 41 hinged at 42 on an extension of front plate 29. A long arm 43 of lever 41 is connected by a push-rod 44 to a hinging plate 45 mounted at the end of a sliding rod 46 that crosses through shock-absorber body 38. Hinging plate 45 is connected by a push-rod 47 to the main arm 30 and by a push-rod 48 to a support block 49 of front brake linings. As explained with reference to FIG. 1, the through-crossing bears at its right end on the figure a movable plate 50 that maintains front suspension spring 37 compressed on collar 39 and the medium arm of the three-arm lever 41 is connected by a rod 41a to a nose 30a of the main arm 30. Rod 46 comprises at its right-hand end a threaded portion on which is adjustably fixed plate 50 by means of adjusting screws 51 and the threaded portion protrudes towards the right-hand side in order to receive a hinging head 52 on which is hinged the end of an inclined coupling rod 53 that is hingedly fixed at its other end to the end of a lever arm 54 towards the top of this figure and mounted at the end of a torsion bar 55 mounted in bearings transversely to the longitudinal axle of the motorcycle and shown in end view in FIG. 2.

At its other end, torsion bar 55 is integral with a lever arm 56 directed towards the bottom of the figure and towards the ground and itself hingedly connected through a curved arm 57 to a hinging head 58 fixed to the left end of a through-crossing rod 59 identical to or of the same type as through-crossing rod 46 utilized for the suspension of the front wheel. Rear helical suspension spring 60 is mounted similarly to front suspension spring 37 and its connection with rear suspension arm 61 that carries rear wheel 62 will not be described in detail. It will be noted that coupling rod 53 is made of two parts, assembled by an adjustable thread with a blocking screw 63 so that it is possible to vary the length of rod 53.

The working of the motorcycle suspension represented in FIG. 2 will now be described. It is first of all necessary to specify that rear and front spring-shock-absorber blocks 38, 64 remain substantially horizontal during displacements of the suspension gear that they control, only rods 46 and 59 and movable plates 50 and 65 being displaced in order to cause to vary the axial compression of the helical suspension springs 37 and 60 and to cause to displace the internal pistons (not represented) of the shock-absorbers.

The front and rear suspensions are represented in position of normal load with the driver riding the motorcyle. It is supposed that the driver initiates a rough brake application on the motorcycle. The vehicle load is thus partially transferred onto the front wheel due to the deceleration that follows braking and spring 37 tends to be more compressed, thereby provoking the displacement towards the left-hand side of the figure of rod 46 and hinging head 52 and tends to cause lever arm 54 to turn in the trigonometric direction.

Torsion bar 55 resiliently drives opposite lever arm 56 in rotation in the same direction, thereby compressing spring 60 which had the tendency to unload due to the load transfer onto the front. Under the supplementary reaction effect to rear suspension spring 60, torsion bar 55 is partially twisted so that only a part of the front overload is transmitted to the rear, thereby nervertheless preventing the shifting of the motorcycle towards the front during braking, typically known as "jump or bow" or at least considerably reduces it.

In the opposite case, for example, at the reacceleration that follows a braking, front wheel 35 is unloaded of part of its load and movable plate 50 is displaced towards the right-hand side of the figure with hinging head 52, thereby tending to cause to turn lever arm 54 in clock-wise direction. Lever arm 56 turns in the same direction and curved arm 57 thus drives rod 59 towards the left-hand side of FIG. 2 and also unloads the rear suspension. Front unloading is thus limited and the rider maintains a good direction adherence on the front wheel during sudden reaccelerations. It is seen that the coupling according to the invention between the front and rear suspension gears efficiently hinders the development of compression dissymmetries between the front and rear suspension gears, this prevention even being able to be effective in the case where one of the suspension gears tends to accidentally fall out, for example, following break of one of suspension springs 37 and 60.

The coupling that has been proposed in FIGS. 1 and 2 by means of rods, of levers and of a torsion bar can be achieved, where necessary, by other means such as cable and sheath systems (bowden cable). Similarly it is understood that helical suspension springs 37 and 60 can be disposed according to other orientations, for example, according to vertical or inclined axes, provided that their inclination veries only slightly during displacements of the suspension. By modifiying the length of rod 53 by means of corresponding screwing when the front and rear suspension gears are loaded, the balance point between the front and rear suspension loads is modified and it is thus possible to correct the loaded seat of the vehicle while ensuring a good coupling between the front and the rear.

It will be well understood that the present invention is in no way limited to the embodiments described and represented herein-above and can be adapted to numerous variants available to the man skilled in the art, without departing front the scope and spirit of the invention.

I claim:

1. A coupling device between a front suspension system of a front wheel of a motorcycle and a rear suspension system of a rear wheel of said motorcyle, each said suspension system including a movable plate and a suspension spring which is axially displaced by said movable plate upon application of a corresponding force to said front and rear suspension systems, respectively, said coupling device comprising:

a front end push-rod having a first end connected with the movable plate of said front suspension system;

a rear end push-rod having a first end connected with the movable plate of said rear suspension system;

a coupling member including a front arm pivotally connected at a first end to a second end of said front end push-rod, and a rear arm connected at a first end to a second end of said rear end push-rod; and a torsion bar mounted to a frame of said motorcycle in a direction transverse to the lengthwise direction of said motorcycle, and having a first end connected to a second end of said front arm and a second end connected to a second end of said rear arm;

each push-rod extending from its respective arm in a direction opposite to the other push-rod;

wherein said rear suspension system compensates for over-loading of said front suspension system through said rear end push-rod, said rear arm, said torsion bar, said front arm and said front end push-rod, and vice versa.

2. A coupling device according to claim 1; wherein said torsion bar is rotatably mounted in at least one bearing carried by the motorcycle; and each end of said torsion bar is rotatably mounted with the front and rear arms of said coupling member.

3. A coupling device according to claim 1; wherein the length of at least one of the push-rods is adjustable under load to permit modification of pre-adjustment of the compression of the helical springs of the front and rear suspension systems.

4. A coupling device according to claim 1; wherein at least one of the suspension springs is constituted by a helical spring pressed against a respective collar by the respective movable plate, and the respective suspension system includes a compression rod crossing through the helical spring in a substantially axial manner and a hinging head attached to the compression rod after it crosses through the movable plate and to the respective arm of the coupling member.

* * * * *